United States Patent
Mendel

(10) Patent No.: US 8,355,477 B1
(45) Date of Patent: Jan. 15, 2013

(54) MULTI-LANE COMMUNICATION WITH MEASURABLE LATENCY

(75) Inventor: David W. Mendel, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 471 days.

(21) Appl. No.: 12/762,995

(22) Filed: Apr. 19, 2010

(51) Int. Cl.
*H04L 7/00* (2006.01)
(52) U.S. Cl. .................. 375/354; 714/700; 713/503
(58) Field of Classification Search .............. 375/354; 370/503, 519; 714/700; 713/503
See application file for complete search history.

(56) References Cited

U.S. PATENT DOCUMENTS

2005/0286565 A1* 12/2005 Vakil et al. .......... 370/503
2006/0092969 A1* 5/2006 Susnow et al. ......... 370/465

OTHER PUBLICATIONS

"Link Delay Accuracy and Cable Delay Calibration," CPRI Specification V4.1, 2009, pp. 55-58, Ericsson AB, Huawei Technologies Co. Ltd, NEC Corporation, Nortel Networks Ltd, Alcatel Lucent, and Nokia Siemens Networks GmbH & Co. KG.

"Measurement and Internal Delays of a RRU," Reference Point 3 Specification Version 4.2, 2010, pp. 105-109, OBSAI.
"Standard for a Precision Clock Synchronization Protocol for Networked Measurement and Control Systems," IEEE std. 1588-2008, pp. 110-112.

* cited by examiner

*Primary Examiner* — Curtis Odom
(74) *Attorney, Agent, or Firm* — Michael Mauriel; Mauriel Kapouytian & Treffert LLP

(57) ABSTRACT

Methods and structures are provided for multi-lane data communication with measurable latency. In a particular embodiment, part of a parallel data set is transmitted from a first device to a second device on a plurality of slave lanes and another part of the data set is transmitted from the first device to the second device on a master lane. A known master delay is applied to data in the master lane that is greater than or equal to the known maximum skew between the lanes. The slave lanes are delayed as needed to align their data with the master lane. In one embodiment, part of the known master lane delay is applied on the first device and another part is applied on the second device. In another embodiment, all of the known master lane delay is applied on the first device and none of it is applied on the second device. In another embodiment, all of the known master lane delay is applied on the second device and none of it is applied on the first device. In another embodiment, part or all of the master lane delay is applied on the link between devices.

26 Claims, 10 Drawing Sheets

//MULTI-LANE COMMUNICATION WITH MEASURABLE LATENCY

BACKGROUND

This invention relates generally to the area of system interconnect technology. Multi-lane communications provide one method of providing high speed communications between integrated circuit ("IC") devices. Some applications require significant distance between transmit and receive systems. For example, a cell phone tower requires communications between tower and base systems. In such applications, the problem of skew from one lane to another can become particularly significant. Multi-lane communication techniques typically handle skew by delaying data arriving on a faster lane until the slower lane arrives. However, with such techniques it is not necessarily known in advance which lane will be slowest for a particular implementation. Therefore, at least some delay needs to be provided on the receive end for all lanes and total latency is unknown. At the same time, however, some communication protocols, such as CPRI and OBSAI require measurable latency. Presently these protocols are single lane protocols. However, as the need for multi-lane communications at higher data rates increases, it may be desirable to adapt protocols for single lane communications to multi-lane communications. Therefore, there is a need for a multi-lane technique that effectively handles deskew while providing measurable latency.

SUMMARY

In one embodiment, a method and integrated circuit ("IC") is provided for multi-lane data communication with measurable latency. In a particular embodiment, part of a parallel data set is transmitted from a first device to a second device on a plurality of slave lanes and another part of the data set is transmitted from the first device to the second device on a master lane. A known master delay is applied to data in the master lane that is greater than or equal to the known maximum skew between the lanes. The slave lanes are delayed as needed to align their data with the master lane. In one embodiment, part of the known master lane delay is applied on the first device and another part is applied on the second device. In another embodiment, all of the known master lane delay is applied on the first device and none of it is applied on the second device. In another embodiment, all of the known master lane delay is applied on the second device and none of it is applied on the first device. In another embodiment, part or all of the master lane delay is applied on the link between devices.

BRIEF DESCRIPTION OF THE DRAWINGS

For purposes of illustration only, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
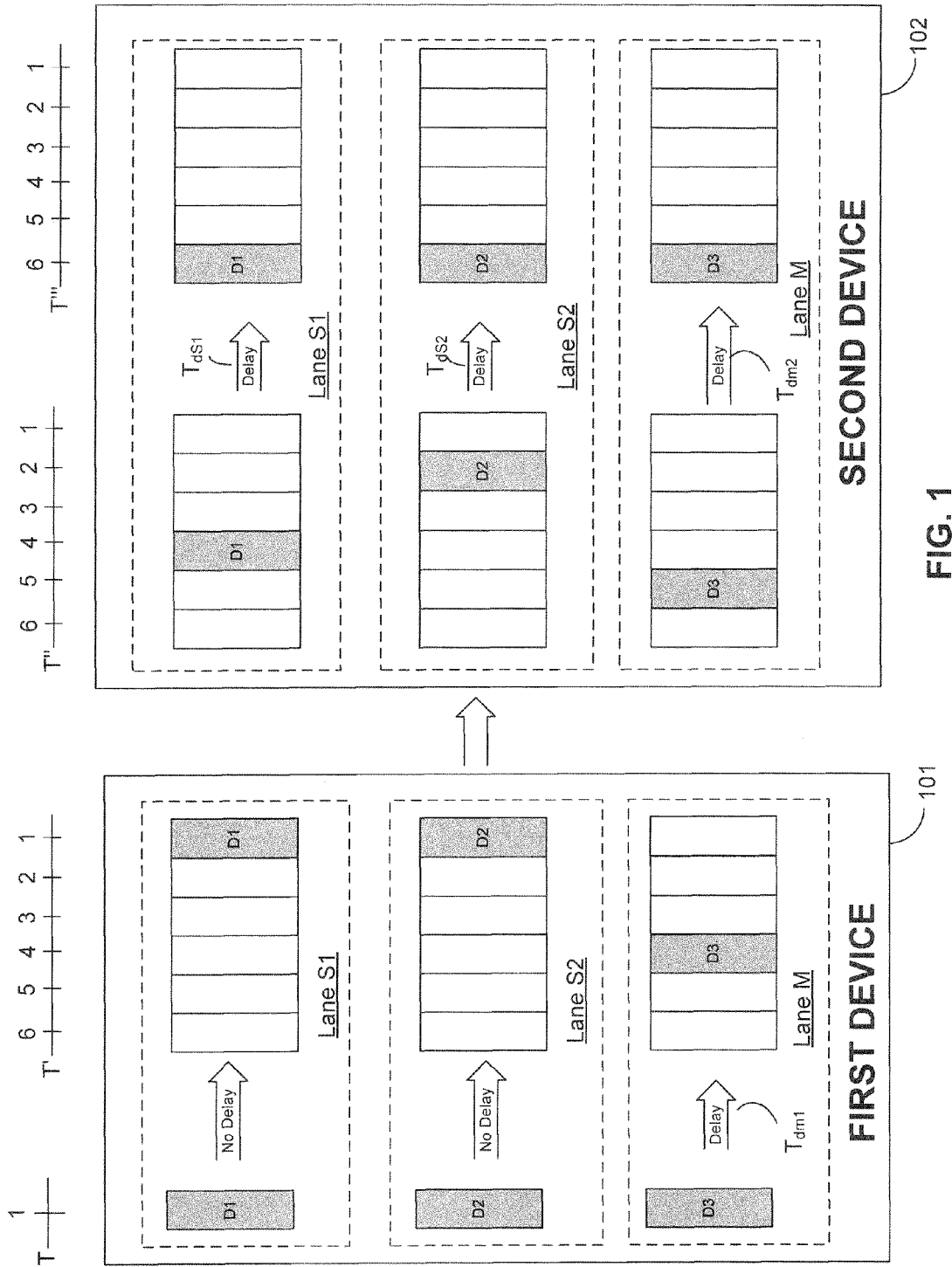
FIG. 1 illustrates a method of transmitting and receiving data from a first device to a second device in accordance with an embodiment of the present invention.

FIG. 1 illustrates a method of transmitting and receiving data from a first device 101 to a second device 102 in accordance with an embodiment of the present invention. A parallel data set comprises data D1, D2, and D3. As used herein, the term "parallel data set" simply means a grouping of data that will need to be aligned at some point to meet the data communication and processing requirements implemented on a first and second device. For example, bits from the same 8-bit word could be striped across various lanes, words from a more complex data-structure could be striped across various lanes, or each unique data structure could be striped across various lanes. Such data may not be aligned at many time points in the data communication and processing process. However, at some point, the data in a parallel data set will be aligned such that there is a known timing relationship between the lanes (e.g., the data in each lane can be advanced together on the same clock cycle).

As illustrated, a parallel data set comprising D1, D2, and D3 exists at time T=1 in a time domain T. In the illustrated embodiment, the data is associated with three lanes including a master lane M and a plurality of slave lanes S1 and S2. In this example, data D3 is in master lane M, data D2 is in slave lane S2, and data D1 is in slave lane S1. The terms "master" and "slave" are used herein simply used as labels reflecting that, in the illustrated embodiments, a known delay is introduced in a "master" lane on the transmit and/or receive side and the slave lanes are aligned to the master lane on the receive side.

In the embodiments illustrated herein, a known delay of $T_{dM}$ is applied to data in the master lane M. $T_{dM}$ is determined based on a known maximum skew between lanes D1, D2, and D3. The maximum skew $T_{skmx}$ is defined for a parallel data set as the greatest time difference expected between receipt of data in any two lanes (in this case, any two of lanes M, S1, and S2) on a receiving device (in this case, second device 102). The maximum skew $T_{skmx}$ is determined exclusive of any delay that is added as part of $T_{dM}$. The delay $T_{dM}$ applied to data in the master lane is selected to be equal to or greater than the maximum skew $T_{skmx}$.

In the various embodiments illustrated herein, the total known master lane delay $T_{dM}$ may be applied on the first device, on the second device, or a portion of it, $T_{dm1}$, may be applied on the transmitting device and another portion of it, $T_{dm2}$, may be applied on the transmitting device. $T_{dM}=T_{dm1}+T_{dm2}$ where $T_{dm1}$ is the amount of delay applied to master lane data on the transmitting device and $T_{dm2}$ is the amount of delay applied to master lane data on the receiving device. In other embodiments, all or a portion of the known master lane delay $T_{dM}$ may be applied on the transmission link between the first and second devices; i.e., the master lane data may be delayed relative to the slave lane data during transmission between the transmitting and receiving devices by a known amount that is equal to all or a portion of the known master lane delay.

In the specific embodiment illustrated in FIG. 1, $T_{dm1}$ and $T_{dm2}$ are both non-zero. In other words, part of the known master delay $T_{dM}$, in the amount of $T_{dm1}$, is applied on the master lane at first device 101 and the remaining part of the known master delay, in the amount of $T_{dm2}$, is applied on the master lane at device 102. Specifically, in the first device 101, a delay of $T_{dm1}$ is introduced to data D3 in master lane M relative to data D2 in slave lane S2 and data D1 in slave lane S1. In the illustrated example, the delay $T_{dm1}$ in the transmitting time domain T' is equal to three clock cycles. Thus, as illustrated, first data including data D1 in lane S1 and data D2 in lane S2 is transmitted at time T'=1 and second data including data D3 is transmitted at time T'=4.

At the second device 102, data in each lane is received at different times in a receiving time domain T". Data D2 is received first at time T"=2. Data D1 in lane S1 is received next at time T"=4. Data D3 in master lane M is received last at time T"=5. A delay of $T_{dm2}$ is applied to data D3 in master lane M such that $T_{dm1}+T_{m2}=T_{dM}$. In this example, $T_{dM}=4$, $T_{dm1}=3$ and $T_{dm2}=1$. The data is aligned by applying a delay of $T_{dS2}$ to D2 in lane S2 and $T_{dS1}$ to D1 in lane S1. In this example, $T_{dS1}=2$ and $T_{dS2}=4$. Therefore, in this example, data is aligned across all three lanes at T'''=6.

As previously discussed, in the illustrated embodiments, a known delay of $T_{dM}$ ix applied to data in the master lane M. Using techniques well known to those skilled in the art, e.g. those taught within the CPRI or OBSAI specifications (www.cpri.info, www.obsai.com), the delay of a single lane M can be measured. Knowing the delay of the master lane M, the delay of the slave lanes can be calculated as latency of M+$T_{dM}$. Therefore, the overall latency between the time slave lane data is transmitted from first device 101 and the time that data is aligned on the second device 102 is known, i.e., there is "measurable latency." In this example, that latency is equal to the master delay $T_{dM}$ plus whatever the transmission time is for the master lane between first device 101 and second device 102. In a more particular embodiment, there may be additional sources of known latency related to other processing that occurs before or after deskew-related processing (e.g. clock compensation, encoding/decoding, scrambling/descramble, etc.) depending on the particular implementation.

Figure 2:
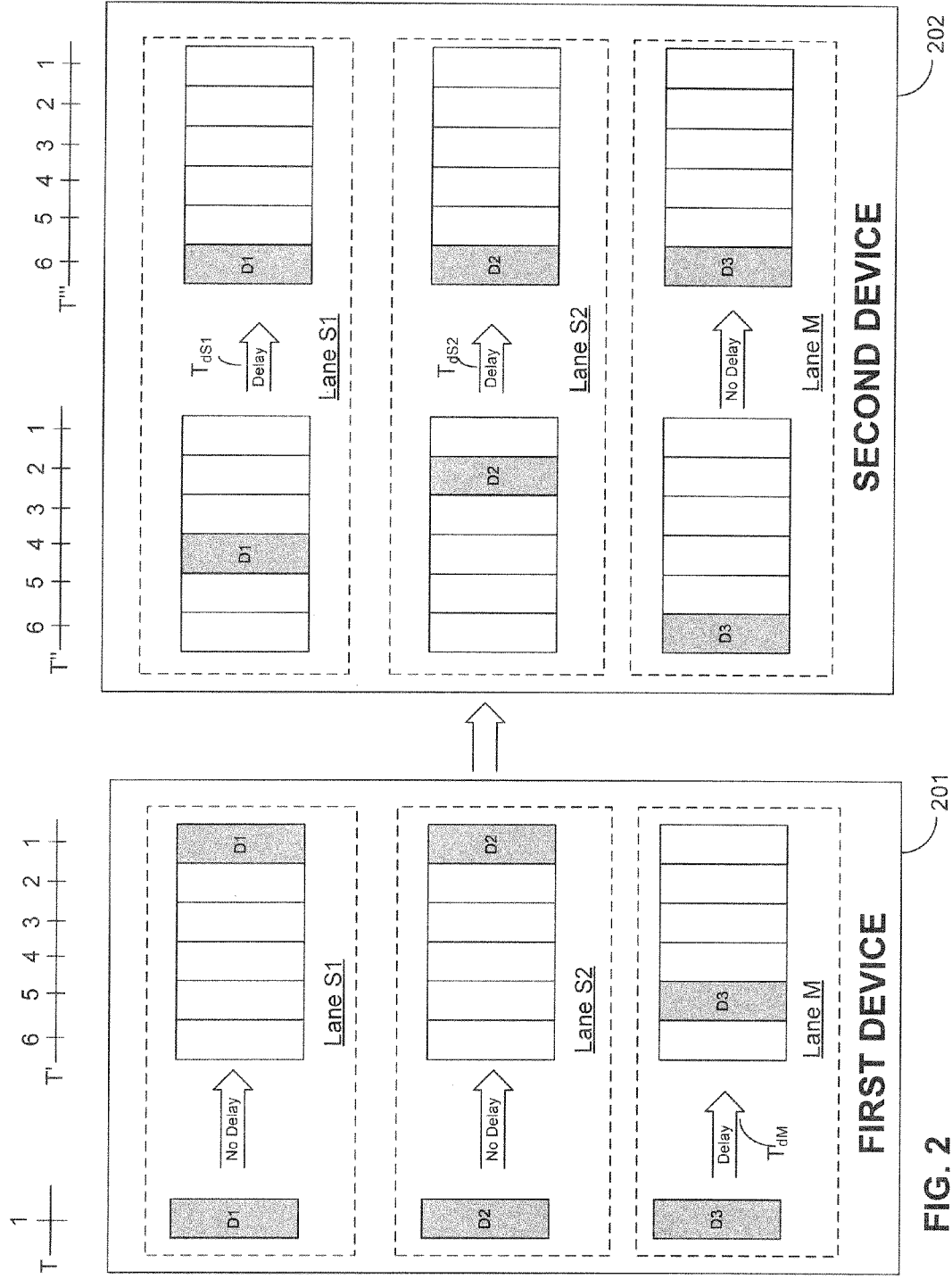
FIG. 2 illustrates a method of transmitting and receiving data from a first device to a second device in accordance with another embodiment of the present invention.

FIG. 2 illustrates a method of transmitting and receiving data from a first device 201 to a second device 202 in accordance with another embodiment of the present invention. In the embodiment of FIG. 2, the full amount of the known master delay $T_{dM}$ is applied to master lane data D3 on first device 201 and no additional deskew related delay is applied to the master lane data D3 on second device 202. Thus, the application of the master delay $T_{dM}$ in the embodiment of FIG. 2 may be viewed as a special case of $T_{dM}=T_{dm1}+T_{dm2}$ where $T_{dm2}=0$.

Specifically, in FIG. 2, a parallel data set comprising D1, D2, and D3 exists at time T=1 in a time domain T. Data D3 is in master lane M, data D2 is in slave lane S2, and data D1 is in slave lane S1. A delay of $T_{dM}=4$ is applied to data D3 in master lane M on first device 201 and no delay is applied to data D1 and D2 in slave lanes S1 and S2. Thus first data including D1 and D2 in slave lanes S1 and S2 is transmitted in time domain T' at T'=1 and second data including data D3 on master lane M is transmitted at T'=5.

Because the master delay $T_{dM}$ is selected to be greater than or equal to the maximum skew $T_{skmx}$ and because $T_{dM}$ is applied entirely on transmitting device 201, it is known in this embodiment that data D3 will not arrive on second device 202 prior to data D1 and D2 in slave lanes S1 and S2. Data D2 arrives at time T"=2, data D1 arrives at T"=4, and data D3 arrives at time T"=6. At device 202, no further deskew related delay is applied to data D3 in master lane M. The data is aligned by applying a delay of $T_{dS2}$ to D2 in lane 82 and $T_{dS1}$ to D1 in lane S1. In this example, $T_{dS1}=2$ and $T_{dS2}=4$. Therefore, in this example, data is aligned across all three lanes at T'''=6.

Figure 3:
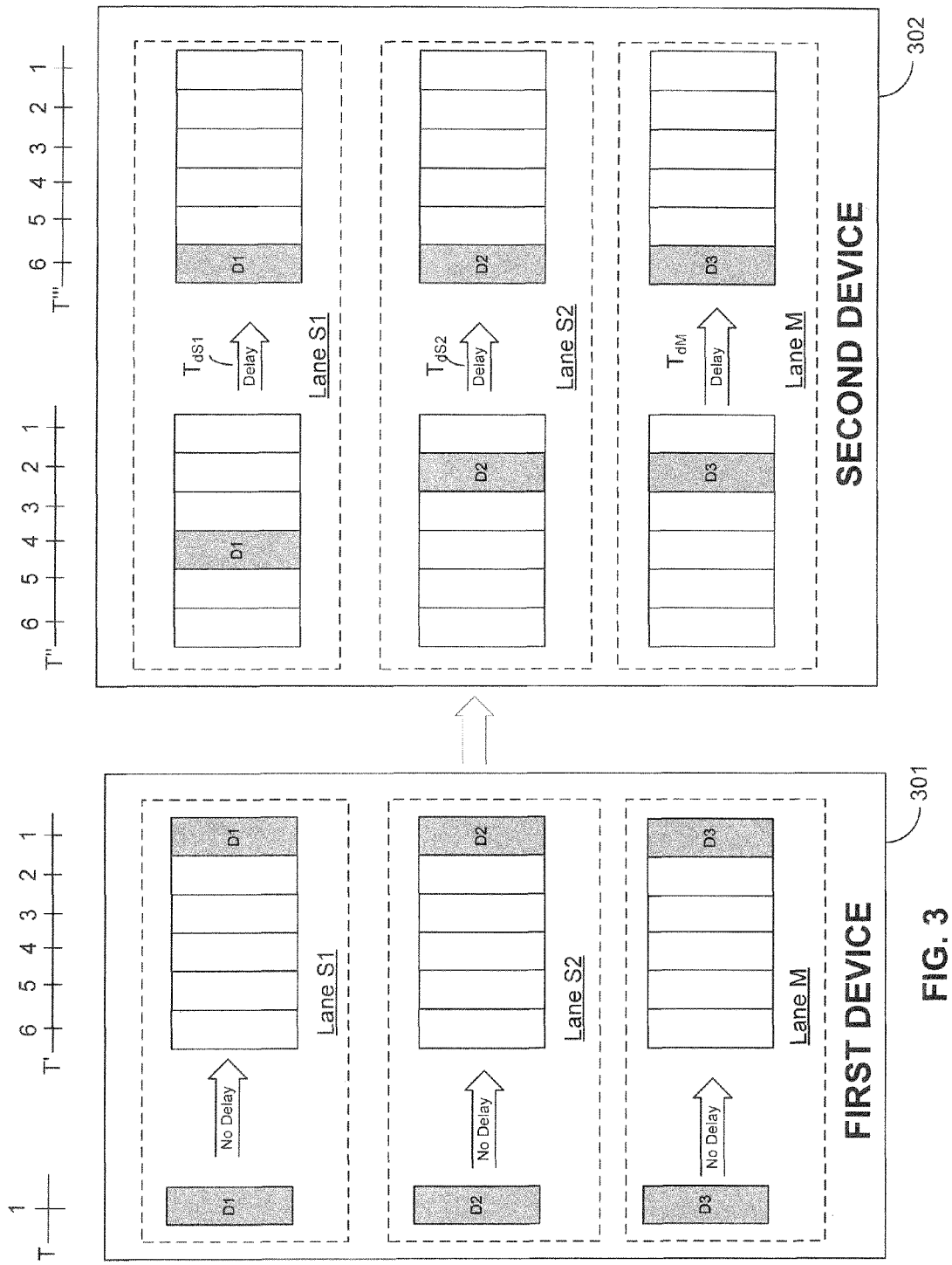
FIG. 3 illustrates a method of transmitting and receiving data from a first device to a second device in accordance with another embodiment of the present invention.

FIG. 3 illustrates a method of transmitting and receiving data from a first device 301 to a second device 302 in accordance with another embodiment of the present invention. In the embodiment of FIG. 3, the full amount of the known master delay $T_{dM}$ is applied to master lane data D3 on second device 302 and no deskew related delay is applied to the master lane data D3 on first device 301. Thus, the application of the master delay $T_{dM}$ in the embodiment of FIG. 3 may be viewed as a special case of $T_{dM}=T_{dm1}+T_{dm2}$ where $T_{dm1}=0$.

Specifically, in FIG. 3, a parallel data set comprising D1, D2, and D3 exists at time T=1 in a time domain T. Data D3 is in master lane M, data D2 is in slave lane S2, and data D1 is in slave lane S1. At first device 301, no delay is applied to data D3 in master lane M and data D1 and D2 in slave lanes S1 and S2. Thus first data including D1 and D2 in slave lanes S1 and S2 and second data including data D3 on master lane M are all transmitted in time domain T' at T'=1.

At device 302, data D2 on slave lane S2 and data D3 on master lane M arrives at time T"=2 while data D1 arrives at T"=4. At device 302, the full known delay $T_{dM}$ is applied to data D3 on master lane M. Specifically, a delay of four clock cycles is applied. The data is aligned to master lane M by applying a delay of $T_{dS2}$ to D2 in lane S2 and $T_{dS1}$ to D1 in lane S1. In this example, $T_{dS1}=2$ and $T_{dS2}=4$. Therefore, in this example, data is aligned across all three lanes at T'''=6.

Figure 4:
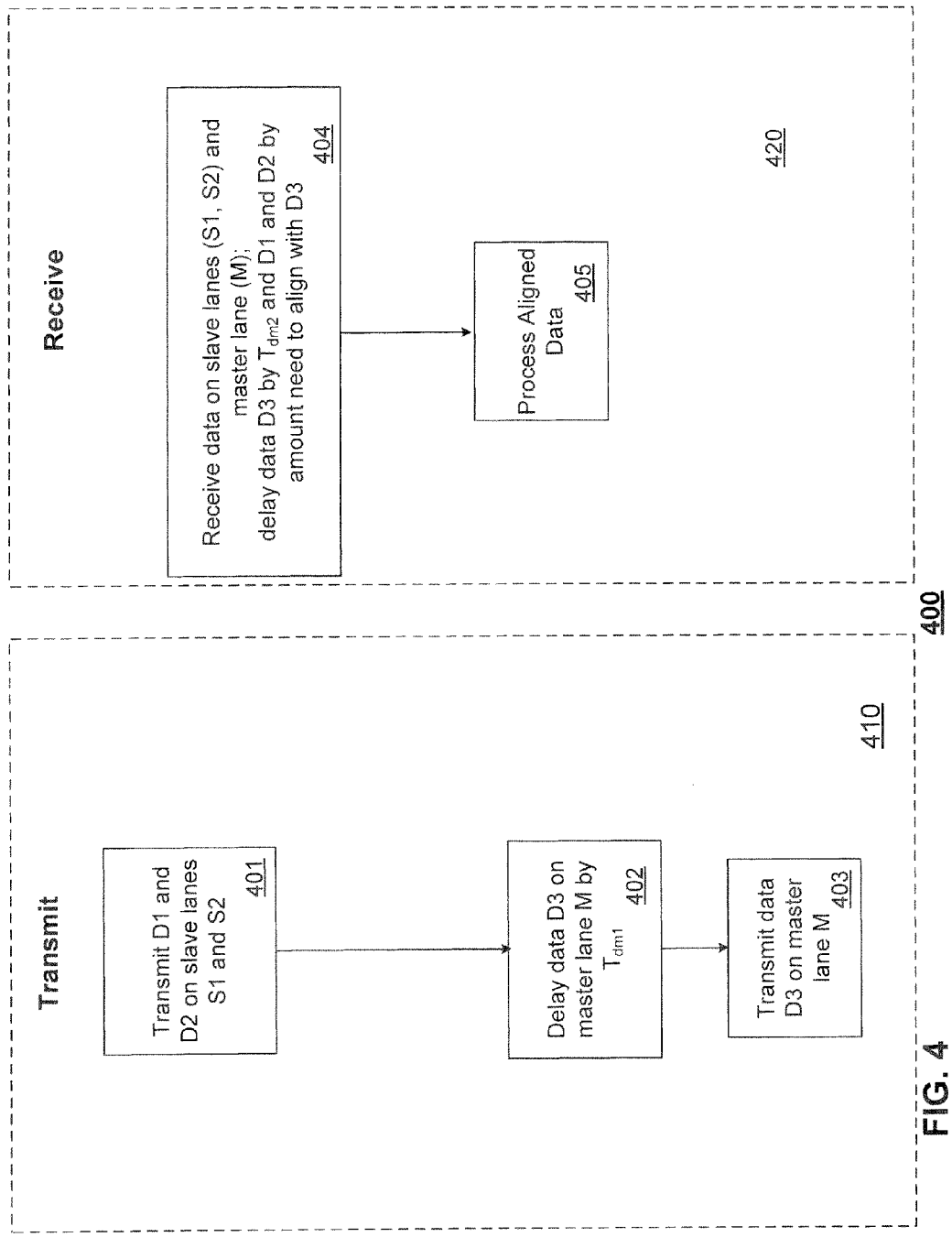
FIG. 4 illustrates a transmit flow and receive flow showing processes for transmitting and receiving the data illustrated in FIG. 1.

FIG. 4 is a flow diagram illustrating a method 400 including a transmit flow 410 and receive flow 520 showing processes for transmitting and receiving the data illustrated in FIG. 1 on master lane M and slave lanes S1 and S2. Referring to transmit process 410, step 401 transmits data D1 and D2 on slave lanes S1 and S2. Step 402 delays data on the master lane for a time equal to $T_{dm1}$. Step 403 transmits data on master lane M.

Referring to receive flow 420, step 404 receives data D1 and D2 on respective slave lanes S1 and S2 and data D3 on master lane M, applies a delay of $T_{dm2}$ to data D3 on master lane M, and delays data on lanes S1 and S2 as needed to align with the master lane M. Specifically, $T_{dm2}$ is selected such that $T_{dm2}+T_{dm1}=T_{dM}$, the full amount of the known master delay, where $T_{dM}$ is selected to be greater than or equal to $T_{skmx}$, the known maximum skew between lanes in the link. Step 405 processes the aligned data.

Figure 5:
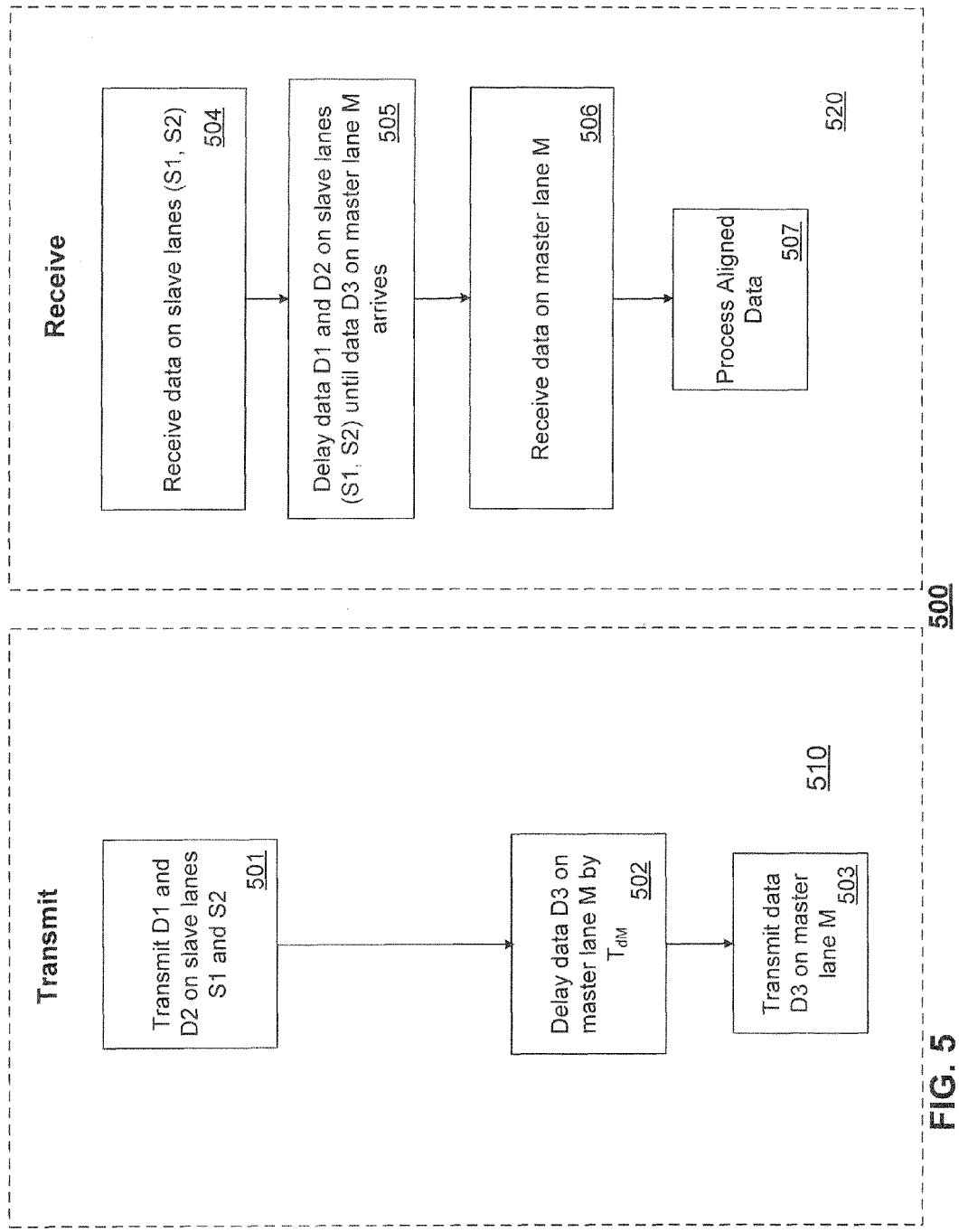
FIG. 5 illustrates a transmit flow and receive flow showing processes for transmitting and receiving the data illustrated in FIG. 2.

FIG. 5 is a flow diagram illustrating a method 500 including a transmit flow 510 and receive flow 520 showing processes for transmitting and receiving the data illustrated in FIG. 2 on master lane M and slave lanes S1 and S2. Referring to transmit process 510, step 501 transmits data D1 and D2 on slave lanes S1 and S2. Step 502 delays data D3 on the master lane for a time equal to the full amount of the known master delay $T_{dM}$. Step 503 transmits data D3 on master lane M.

Referring to receive flow 520, step 504 receives data D1 and D2 on respective slave lanes S1 and S2. Step 505 delays data D1 and D2 on slave lanes S1 and S2 until data D3 arrives on master lane M. Step 506 receives data D3 on master lane M. In this embodiment, because there is no deskew related delay on master lane M on the receiving device, once date D3 arrives on master lane M, the data is aligned and the method proceeds to step 507, which processes the aligned data.

Figure 6:
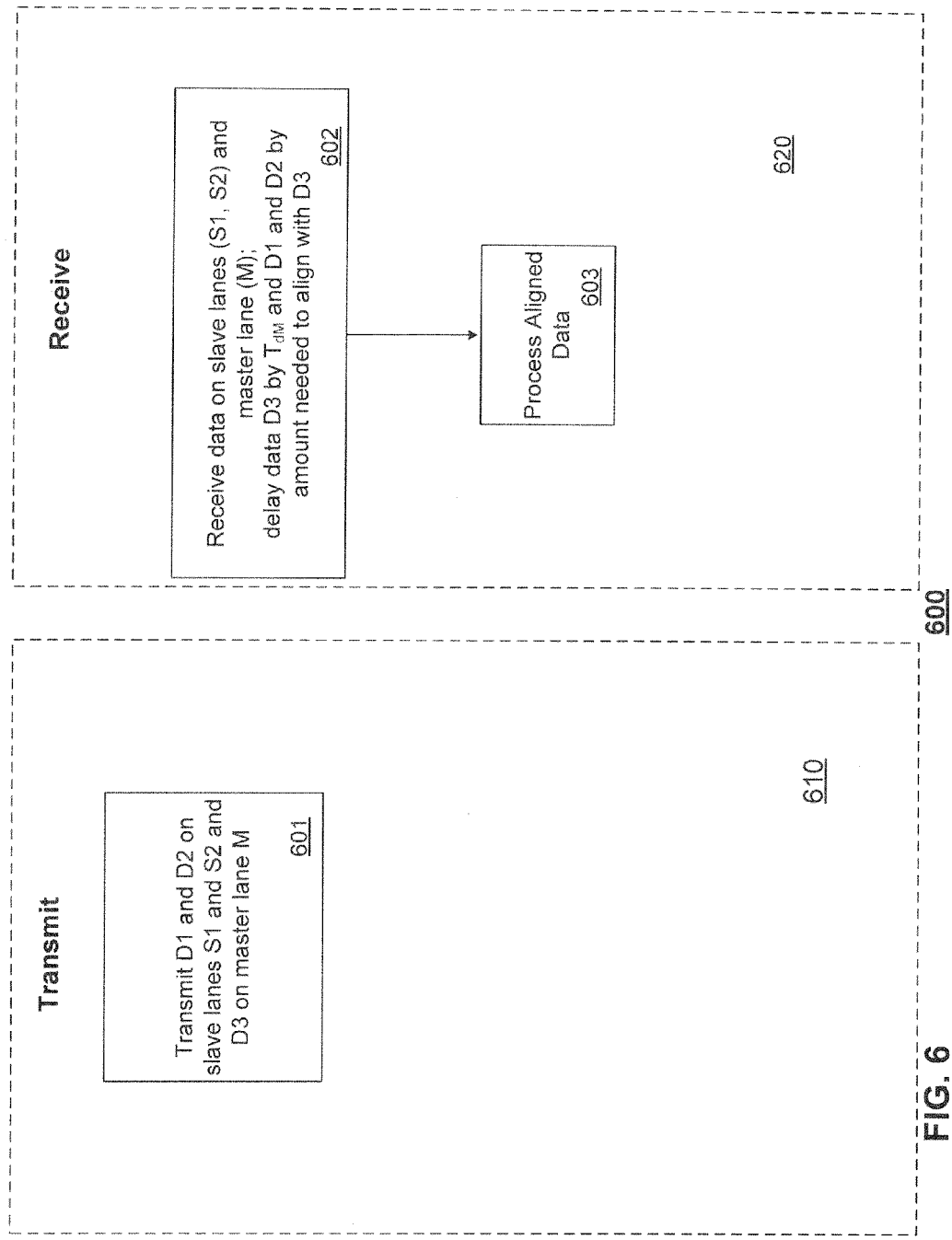
FIG. 6 illustrates a transmit flow and receive flow showing processes for transmitting and receiving the data illustrated in FIG. 3.

FIG. 6 is a flow diagram illustrating a method 600 including a transmit flow 610 and receive flow 620 showing processes for transmitting and receiving the data illustrated in FIG. 3 on master lane M and slave lanes S1 and S2. Referring to transmit process 610, step 601 transmits data D1 and D2 on slave lanes S1 and S2 and data D3 on master lane M.

Referring to receive flow 620, step 602 receives data D1 and D2 on respective slave lanes S1 and S2 and data D3 on master lane M, applies a known delay to the master lane M, and delays lanes S1 and S2 as needed to align with the master lane M. Specifically, data D3 on master lane M is delayed by the full amount of the known master delay $T_{dM}$. Step 603 processes the aligned data.

Figure 7:
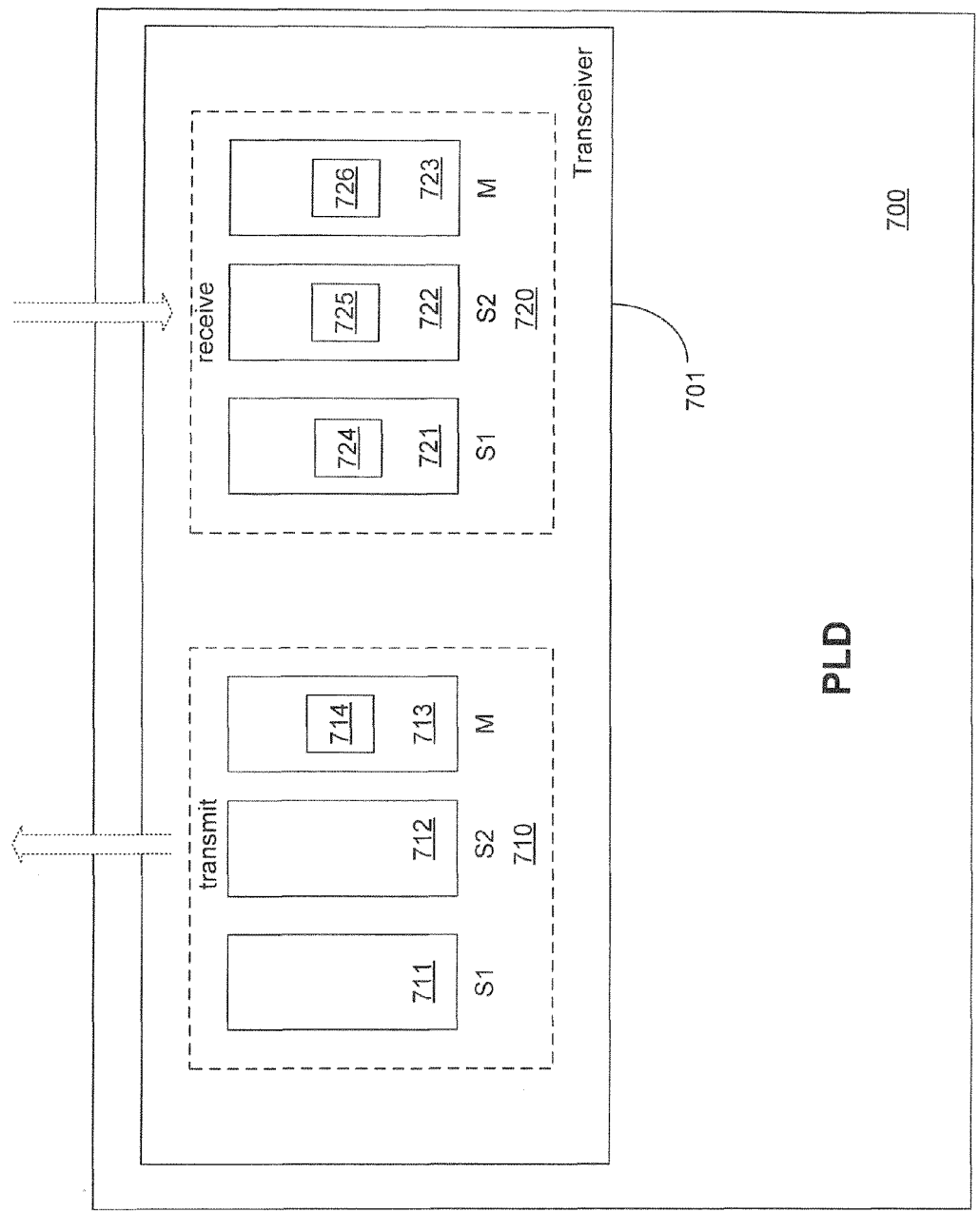
FIG. 7 illustrates a programmable logic device ("PLD") including a transceiver in accordance with an embodiment of the present invention.

FIG. 7 illustrates a programmable logic device ("PLD") 700 including a transceiver 701 in accordance with an embodiment of the present invention. Specifically, transceiver 701 illustrates circuitry used in carrying out the method illustrated in FIG. 1.

Transceiver 701 includes transmit circuitry 710 and receive circuitry 720. Transmit circuitry 710 includes a plurality of transmit lane circuitry including lane circuitry 711, 712, and 713 corresponding to a plurality of transmit data lanes including slave lanes S1 and S2 and a master lane M. Transmit circuitry 710 also includes delay circuitry 714 coupled to lane circuitry 713 to provide a delay of data in master lane M relative to data in slave lanes S1 and S2. Those skilled in the art will appreciated that delay circuitry 714 may be implemented in various forms. In one example, delay circuitry 724 comprises a delay chain (for example, a plurality of flip-flops coupled in series). In another example, delay circuitry comprises a deskew FIFO configurable to delay data in master lane M relative to data in slave lanes S1 and S2. Delay circuitry 714 is either arranged or configurable to provide a delay of $T_{dm1}$, which corresponds to the delay described in the context of FIG. 1. Those skilled in the art will appreciate that in a particular implementation, additional delay circuitry may also be coupled to slave lane circuitry 711 and 712. However, in such an alternative, such additional delay circuits will either not be used or will be configurable to provide less or no transmit delay of data in slave lanes S1 and S1 relative to the delay provided for master lane M.

Receive circuitry 720 includes a plurality of receive lane circuitry including lane circuitry 721, 722, and 723 corresponding to a plurality of receive data lanes including slave lanes S1 and S2 and master lane M. Receive circuitry 720 also includes delay circuitry 724 coupled to lane circuitry 721, delay circuitry 725 coupled to lane circuitry 722, and delay circuitry 726 coupled to lane circuitry 723. Those skilled in the art will appreciated that delay circuitry 724, 725, and 726 may be implemented in various forms as described above with respect to delay circuitry 714. Preferably, delay circuits 724, 725, and 726 are independently configurable. Specifically, 726 is either arranged or configurable to provide a delay of $T_{dm2}$ as described in the context of FIG. 1. Delay circuitry 724 and 725 are preferably independently configurable so that different amounts of delay can potentially be provided in each slave lane to correct for skew between the slave lanes and to align the slave lanes with the master lane.

Figure 8:
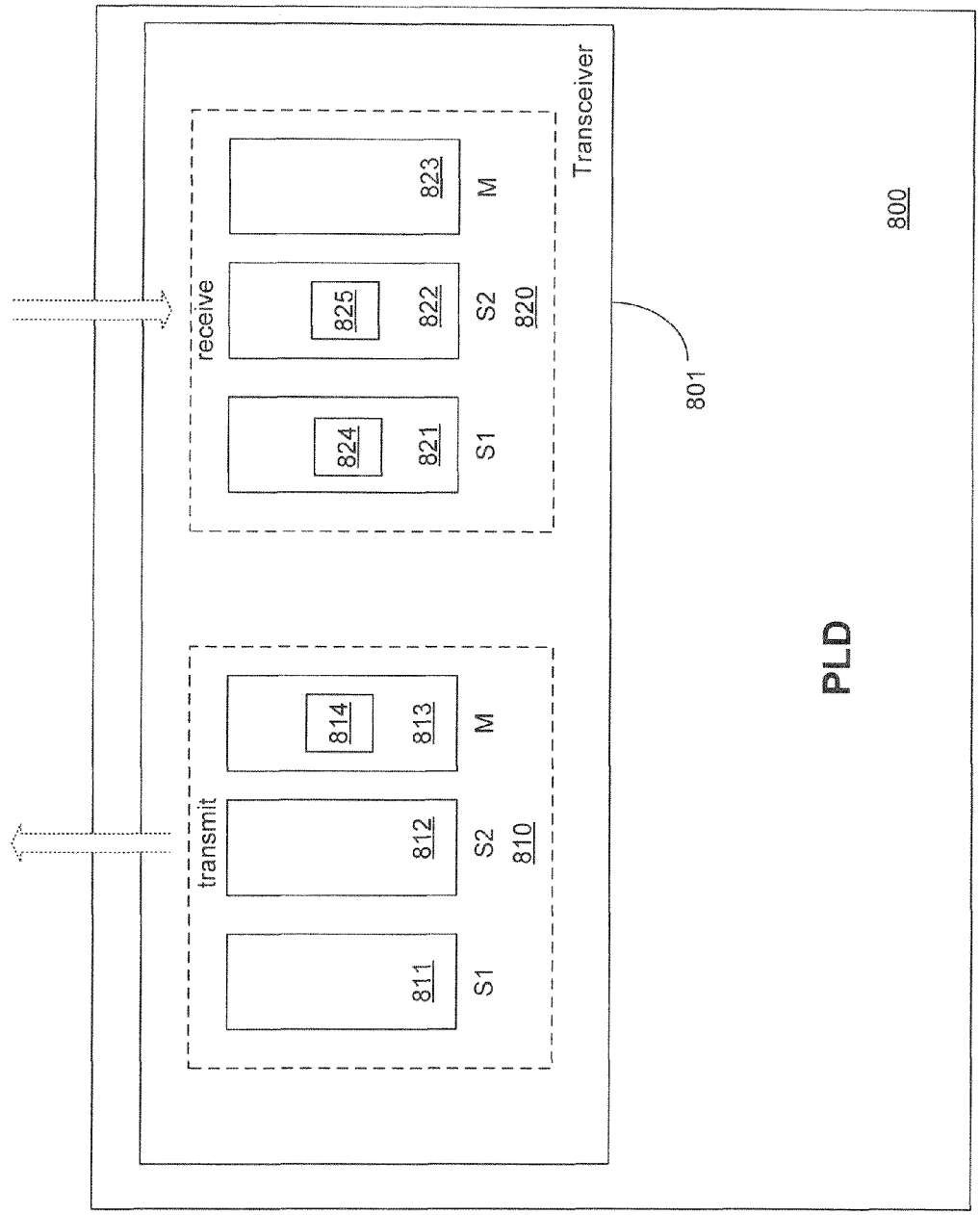
FIG. 8 illustrates a PLD including a transceiver in accordance with another embodiment of the present invention.

FIG. 8 illustrates a PLD 800 including a transceiver 801 in accordance with an embodiment of the present invention. Specifically, transceiver 801 illustrates circuitry used in carrying out the method illustrated in FIG. 2.

Transceiver 801 includes transmit circuitry 810 and receive circuitry 820. Transmit circuitry 810 includes a plurality of transmit lane circuitry including lane circuitry 811, 812, and 813 corresponding to a plurality of transmit data lanes including slave lanes S1 and S2 and a master lane M. Transmit circuitry 810 also includes delay circuitry 814 coupled to lane circuitry 813 to provide a delay of data in master lane M relative to data in slave lanes S1 and S2. Delay circuitry 814 is either arranged or configurable to provide a delay of $T_{dM}$, which corresponds to the master delay described in the context of FIG. 2. Those skilled in the art will appreciate that in a particular implementation, additional delay circuitry may also be coupled to slave lane circuitry 811 and 812. However, in such an alternative, such additional delay circuits will either not be used or will be configurable to provide less or no transmit delay of data in slave lanes S1 and S1 relative to the delay provided for master lane M.

Receive circuitry 820 includes a plurality of receive lane circuitry including lane circuitry 821, 822, and 823 corresponding to a plurality of receive data lanes including slave lanes S1 and S2 and master lane M. Receive circuitry 820 also includes delay circuitry 824 coupled to lane circuitry 821 and delay circuitry 825 coupled to lane circuitry 822. Preferably, delay circuits 824 and 825 are independently configurable so that different amounts of delay can potentially be provided in each slave lane to correct for skew between the slave lanes and also to align the slave lanes with the master lane. In this example, no delay circuitry is necessarily coupled to lane circuitry 823 as all the known master delay is applied on the transmit side rather than on the receive side. Those skilled in the art will appreciate that in a particular implementation, additional delay circuitry may also be coupled to master lane circuitry 823. However, in such an alternative, such additional delay circuits will either not be used or will be configurable to provide no deskew-related delay to received master lane data.

Figure 9:
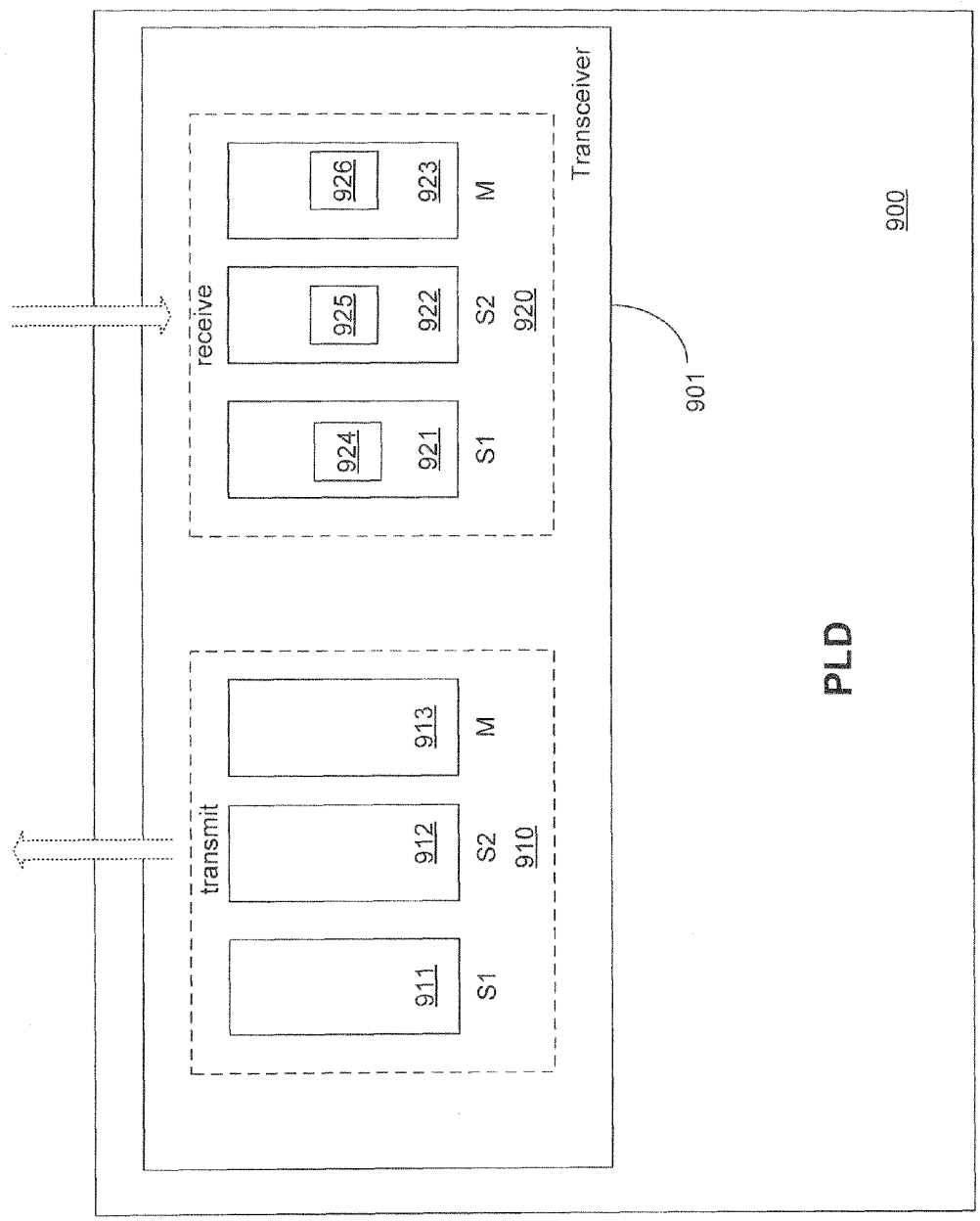
FIG. 9 illustrates a PLD including a transceiver in accordance with an embodiment of the present invention.

FIG. 9 illustrates a PLD 900 including a transceiver 901 in accordance with an embodiment of the present invention. Specifically, transceiver 901 illustrates circuitry used in carrying out the method illustrated in FIG. 3.

Transceiver 901 includes transmit circuitry 910 and receive circuitry 920. Transmit circuitry 910 includes a plurality of transmit lane circuitry including lane circuitry 911, 912, and 913 corresponding to a plurality of transmit data lanes including slave lanes S1 and S2 and a master lane M.

Receive circuitry 920 includes a plurality of receive lane circuitry including lane circuitry 921, 922, and 923 corresponding to a plurality of receive data lanes including slave lanes S1 and S2 and master lane M. Receive circuitry 920 also includes delay circuitry 924 coupled to lane circuitry 921, delay circuitry 925 coupled to lane circuitry 922, and delay circuitry 926 coupled to lane circuit 923. Delay circuitry 926 is either arranged or configurable to provide a delay of $T_{dM}$, the full known master delay, as described in the context of FIG. 3. Delay circuitry 924 and 925 are preferably independently configurable so that different amounts of delay can potentially be provided in each slave lane to correct for skew between the slave lanes and to align the slave lanes with the master lane.

Those skilled in the art will of course appreciate that FIGS. 7, 8, and 9 (like FIGS. 1, 2, and 3) provide simplified examples for purposes of illustrating the principles of embodiments of the present invention. In particular implementations, a smaller or larger number of lanes would be provided and, in particular, more or fewer slave lanes may be provided per master lane. Furthermore, a transceiver may have several groupings of transmit and receive lanes each having a master lane and respective pluralities of slave lanes.

Transceivers 701, 801, and 901 may be implemented as transceivers in any integrated circuit ("IC"). It may, for example, be implemented in an IC that supports transceiver configuration. Such configuration may be accomplished via data stored in programmable elements on the IC. Programmable elements may include dynamic or static RAM, flip-flops, electronically erasable programmable read-only memory (EEPROM) cells, flash, fuse, anti-fuse programmable connections, or other memory elements. Transceiver configuration may also be accomplished via one or more externally generated signals received by the IC during operation of the IC, Data represented by such signals may or may not be stored on the IC during operation of the IC. Transceiver configuration may also be accomplished via mask programming during fabrication of the IC. While mask programming may have disadvantages relative to some of the field programmable options already listed, it may be useful certain high volume applications.

A specific example of an IC that supports transceiver configuration is a PLD. PLDs (also referred to as complex PLDs, programmable array logic, programmable logic arrays, field PLAs, erasable PLDs, electrically erasable PLDs, logic cell arrays, field programmable gate arrays, or by other names) provide the advantages of fixed ICs with the flexibility of custom ICs. PLDs have configuration elements (i.e., programmable elements) that may be programmed or reprogrammed. Placing new data into the configuration elements programs or reprograms the PLDs logic functions and associated routing pathways.

Figure 10:
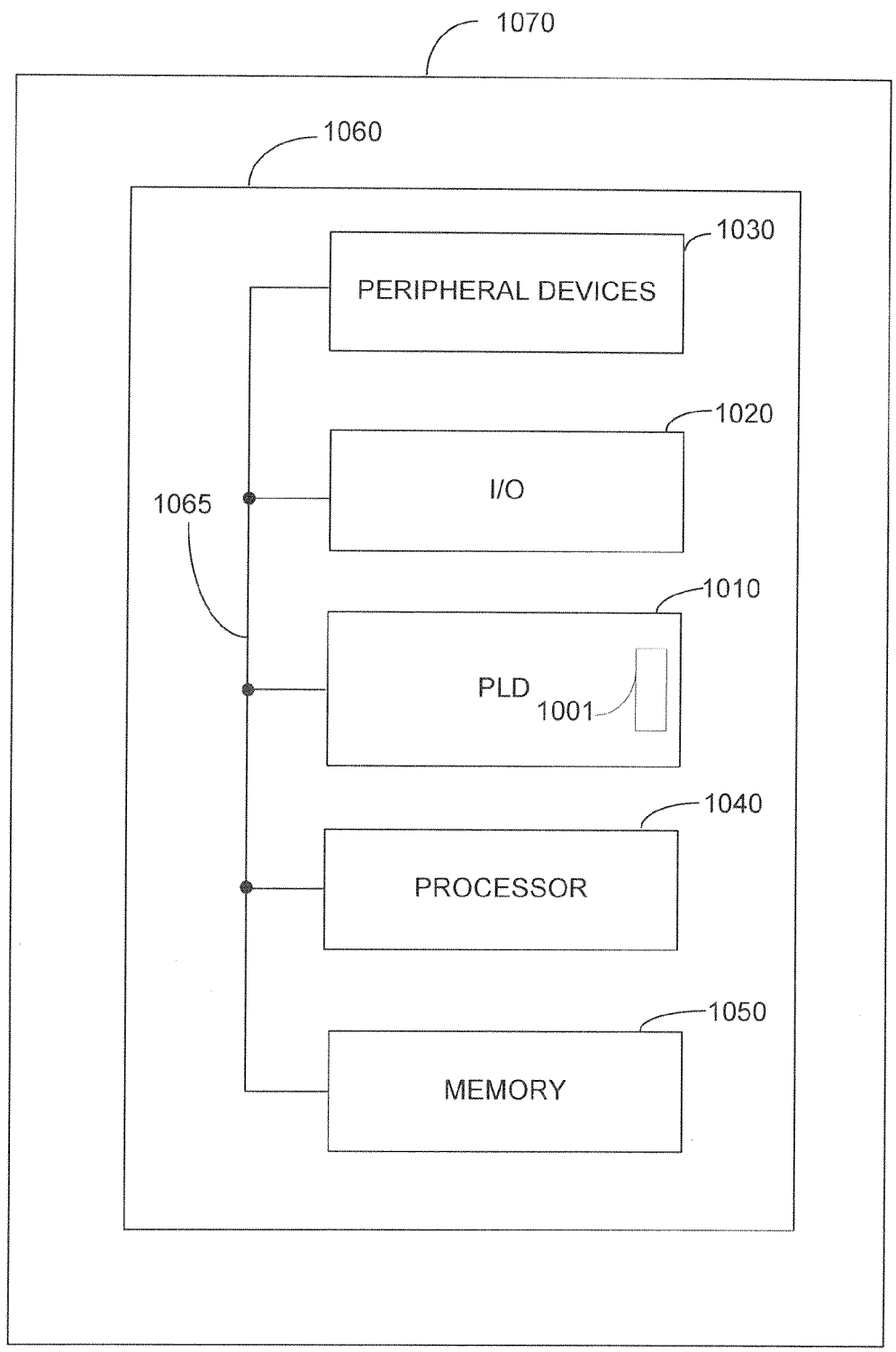
FIG. 10 illustrates an exemplary data processing system including a PLD, the PLD including a transceiver in accordance with an embodiment of the present invention.

FIG. 10 illustrates an exemplary data processing system 1000 including PLD 1010. PLD 1010 includes transceiver 1001, transceiver 1001 being in accordance with an embodiment of the present invention. For ease of illustration, only a single transceiver is shown, however, a PLD such as PLD 1010 may include multiple transceivers such as transceiver 1001.

Data processing system 1000 may include one or more of the following additional components: processor 1040, memory 1050, input/output (I/O) circuitry 1020, and peripheral devices 1030 and/or other components. These components are coupled together by system bus 1065 and are populated on circuit board 1060 which is contained in end-user system 1070. A data processing system such as system 1000 may include a single end-user system such as end-user system 1070 or may include a plurality of systems working together as a data processing system.

System 1000 can be used in a wide variety of applications, such as computer networking, data networking, instrumentation, video processing, digital signal processing, or any other application where the advantage of using programmable or reprogrammable logic in system design is desirable. PLD 1010 can be used to perform a variety of different logic functions. For example, PLD 1010 can be configured as a processor or controller that works in cooperation with processor 1040 (or, in alternative embodiments, a PLD might itself act as the sole system processor). PLD 1010 may also be used as an arbiter for arbitrating access to shared resources in system 1000. In yet another example, PLD 1010 can be configured as an interface between processor 1040 and one of the other components in system 1000. It should be noted that system 1000 is only exemplary.

In one embodiment, system 1000 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but only by the following claims.

What is claimed is:

1. A method of multi-lane data communication utilizing a plurality of lanes in a multi-lane communications link, the plurality of lanes including a designated master lane and a plurality of designated slave lanes, the method comprising:
   transmitting first data of a parallel data set from a first device on a plurality of slave lanes at a first transmission time;
   transmitting second data of the parallel data set on the master lane at a second transmission time that is a first delay time after the first transmission time;
   receiving the first and second data at a second device;
   delaying the second data on the master lane at the second device by a second delay time; and
   delaying the first data on the plurality of slaves lanes at the second device to align it with the second data;
   wherein a sum of the first delay time plus the second delay time is greater than or equal to a maximum skew time across the plurality of lanes in the link.

2. The method of claim 1 wherein the first delay time is zero, the first and second transmission times being substantially equal.

3. The method of claim 1 wherein the second delay time is zero.

4. The method of claim 1 wherein receiving comprises receiving data at different times.

5. The method of claim 4 wherein the second data is received at the second device after the first data is received at the second device.

6. The method of claim 4 wherein a portion of the first data is received at the second device when or after the second data is received at the second device.

7. A method of multi-lane data communication utilizing a plurality of lanes in a multi-lane communications link, the plurality of lanes including a designated master lane and a plurality of designated slave lanes, the method comprising:
   transmitting first data of a parallel data set from a first device on the plurality of slave lanes at a first time; and
   transmitting second data of the parallel data set on the master lane at a second time, the second time relative to the first time corresponding to a delay time that is greater than or equal to a maximum skew time across the plurality of lanes in the link.

8. The method of claim 7 further comprising:
   receiving the first data at a second device on the plurality of slave lanes; and delaying the received first data on the slave lanes at the second device at least until the second data arrives on the master lane.

9. The method of claim 7 wherein second data received on the master lane is not delayed for skew correction at the second device.

10. An integrated circuit device ("IC") adapted for communicating on a plurality of lanes of lanes in a multi-lane communications link, the plurality of lanes including a designated master lane and a plurality of designated slave lanes, the IC comprising:
transmit circuitry arranged in a plurality of transmit lanes including the master lane and the plurality of slave lanes; and
delay transmit circuitry coupled to the transmit circuitry corresponding to the master lane and adapted to apply a known master delay to data transmitted on the master lane, the known master delay being greater than or equal to the maximum skew time between the plurality of lanes.

11. The IC of claim 10 further comprising:
receive circuitry arranged in a plurality of transmit lanes including a master lane and a plurality of slave lanes; and
receive delay circuitry coupled to the receive circuitry and adapted to delay data received on the plurality of slave lanes until corresponding data arrives on the master lane.

12. The IC of claim 11 wherein the receive circuitry is arranged such that data received on the master lane is not delayed for skew correction relative to data received on the slave lanes.

13. A programmable logic device ("PLD") comprising the IC of claim 10.

14. A data processing system comprising the PLD of claim 13.

15. An integrated circuit device ("IC") adapted for communicating on a plurality of lanes of lanes in a multi-lane communications link, the plurality of lanes including a designated master lane and a plurality of designated slave lanes, the IC comprising:
transmit circuitry arranged in a plurality of transmit lanes including the master lane and the plurality of slave lanes; and
delay transmit circuitry coupled to the transmit circuitry corresponding to the master lane and adapted to apply a first portion of a known master delay to data transmitted on the master lane, the known master delay being greater than or equal to a maximum skew time between the plurality of lanes.

16. The IC device of claim 15 further comprising:
receive circuitry arranged in a plurality of transmit lanes including a master lane and a plurality of slave lanes; and
receive delay circuitry coupled to the receive circuitry and adapted to apply a remaining portion of the known master delay to data received on the master lane and further adapted to delay data on the plurality of slave lanes as needed to align it with data on the master lane.

17. A programmable logic device ("PLD") comprising the IC of claim 15.

18. A data processing system comprising the PLD of claim 17.

19. An integrated circuit device ("IC") adapted for communicating on a plurality of lanes of lanes in a multi-lane communications link, the plurality of lanes including a designated master lane and a plurality of designated slave lanes, the IC comprising:
transmit circuitry arranged in a plurality of transmit lanes including the master lane and the plurality of slave lanes;
receive circuitry arranged in a plurality of transmit lanes including the master lane and the plurality of slave lanes; and
receive delay circuitry coupled to the receive circuitry and adapted to delay data received on the master lane for a known master delay and further adapted to delay data on the plurality of slave lanes as needed to align it with data on the master lane, the known master delay being greater than or equal to a maximum skew time between the plurality of lanes.

20. A programmable logic device ("PLD") comprising the IC of claim 19.

21. A data processing system comprising the PLD of claim 20.

22. A method of multi-lane data communication utilizing a plurality of lanes in a multi-lane communications link, the plurality of lanes including a designated master lane and a plurality of designated slave lanes, the method comprising:
transmitting first data of a parallel data set from a first device on a plurality of slave lanes at a first transmission time;
transmitting second data of the parallel data set on the master lane at a second transmission time that is a first delay time after the first transmission time;
receiving the first and second data at a second device;
delaying the second data relative to the first data during transmission between the first and second devices by a second delay time;
delaying the second data on the master lane at the second device by a third delay time; and
delaying the first data on the plurality of slaves lanes at the second device to align it with the second data;
wherein a sum of the first delay time plus the second delay time plus the third delay time is greater than or equal to a maximum skew time across the plurality of lanes in the link.

23. The method of claim 22 wherein the first delay time is zero, the first and second transmission times being substantially equal.

24. The method of claim 22 wherein the third delay time is zero.

25. The method of claim 22 wherein the second delay time is greater than zero.

26. The method of claim 22 wherein receiving comprises receiving data at different times.

* * * * *